May 1, 1945.   R. K. ILER ET AL   2,375,002
PROCESS FOR MAKING SODIUM SULPHATE AND CHLORINE
Original Filed Dec. 23, 1939
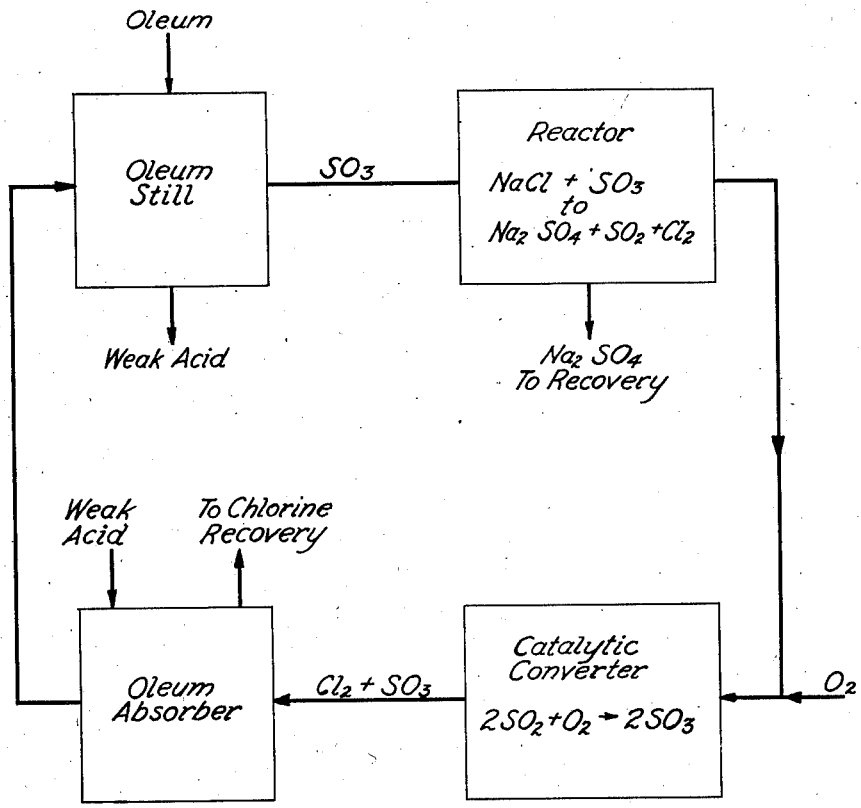
Ralph K. Iler
Francis J. McAdam   INVENTOR.
BY
George T. Johannesen Patented May 1, 1945

2,375,002

UNITED STATES PATENT OFFICE 2,375,002

PROCESS FOR MAKING SODIUM SULPHATE AND CHLORINE

Ralph K. Iler, East Cleveland, and Francis J. McAdam, Cleveland, Ohio, assignors to E. I. du Pont de Nemours & Company, Wilmington, Del., a corporation of Delaware Original application December 23, 1939, Serial No. 310,838. Divided and this application November 29, 1940, Serial No. 367,745

4 Claims. (Cl. 23—219)

This invention relates to the manufacture of chlorine and is directed particularly to the recovery of chlorine from mixtures of sulphur dioxide and chlorine as obtained by the action of sulphur trioxide on sodium chloride. More particularly this invention is directed to processes in which sulphur trioxide obtained from a sulphur trioxide-addition complex is caused to act on sodium chloride to liberate equimolecular amounts of sulphur dioxide and chlorine, the sulphur dioxide oxidized to sulphur trioxide, the sulphur trioxide separated by combination with a substance adapted to form therewith a sulphur trioxide-addition complex, and decomposing said addition complex either to liberate sulphur trioxide for reaction with sodium chloride or, in the case of the NaCl complex, to liberate sodium sulphate, chlorine, and sulphur dioxide.

It has long been recognized as desirable to produce chlorine and sodium sulphate by reacting sulphur trioxide with common salt, and divers processes have been suggested for accomplishing this end. Yet, the fact that none of these suggestions have proved of practical value suggests that in some aspects at least the processes were impractical, and we find that one of the reasons lies in the failure of the prior art to provide any practical method of separating the equimolecular mixtures of sulphur dioxide and chlorine which result from the reaction of salt and sulphur trioxide, either directly at appropriate temperatures or through the decomposition of an intermediate product, sodium chlorosulphonate. Thus, it has been proposed to make chlorine and salt cake (sodium sulphate) by passing sulphur trioxide through towers packed with salt, passing the resulting mixture in the presence of air or oxygen in contact with a material adapted to catalyze the reaction sulphur dioxide to sulphur trioxide, passing the resulting mixture again in contact with sodium chloride whereby the sulphur trioxide is caused to react with the salt to form more sodium sulphate, sulphur dioxide, chlorine, and so on, until the sulphur dioxide in the gas is reduced to a nominal figure. Such processes, however, cannot produce a sulphur dioxide-free gas because each step for the removal of sulphur trioxide is accompanied by the formation of sulphur dioxide. It has also been proposed to separate sulphur dioxide and chlorine by liquefaction and fractional distillation, but complete separation is difficult to obtain and the impure sulphur dioxide is of little value by itself.

We have now found that chlorine and sodium sulphate may be produced simply and effectively by causing sulphur trioxide to act on sodium chloride in a manner to produce a gaseous mixture composed essentially of equimolecular quantities of sulphur dioxide and chlorine, adding oxygen to the mixture, catalytically oxidizing the sulphur dioxide to sulphur trioxide, and separating the sulphur trioxide as a sulphur trioxide-addition complex which may be utilized in the production of further quantities of sulphur dioxide and chlorine.

Our invention may be more fully understood by referring to the accompanying drawing which illustrates graphically the several steps utilized in carrying out the processes of our invention. As thus illustrated, we first cause sulphur trioxide to act on salt in a manner such that the products are sodium sulphate, sulphur dioxide, and chlorine. This reaction may be carried out in a single step at a temperature above about 450° C., in which case the reaction may be represented as $2NaCl + 2SO_3 \rightarrow Na_2SO_4 + SO_2 + Cl_2$ or the reaction may be carried out in two stages in which sodium chlorosulphonate is first formed by reacting sulphur trioxide and salt at a temperature not substantially exceeding 150° C. and preferably below about 100° C., and then decomposed by heating into sodium sulphate, sulphur dioxide and chlorine.

Sulphur trioxide suitable for these reactions may be obtained in the usual manner by the oxidation of sulphur in the contact process. The converter gases from such processes are freed of undesirable constituents by absorbing the sulphur trioxide in sulphur trioxide monohydrate to form oleum or fuming sulphuric acid from which the sulphur trioxide may be regenerated in a highly pure form. It is especially desirable to have a highly purified sulphur trioxide if the high temperature process for the direct formation of sodium sulphate, sulphur dioxide, and chlorine is employed, because otherwise the gaseous products of the reaction will be contaminated with the undesirable constituents of the sulphur trioxide. If the low temperature reaction is employed, however, less highly purified sulphur trioxide may be used since in this case the sulphur trioxide is wholly absorbed as sodium chlorosulphonate and the impurities are thereby separated.

The sulphur dioxide-chlorine mixture thus obtained is diluted with oxygen in the amount required to give the desired $SO_2:O_2$ ratio for efficient conversion of the sulphur dioxide to sulphur trioxide and so much diluent gas, preferably chlorine recycled from a subsequent step in the process, to give an $SO_2$ concentration commensurate with the capability of the converter system to dissipate the heat of the reaction. This gas mixture is then exposed to a catalyst or oxidation promoter under conditions adapted to promote the oxidation of sulphur dioxide to sulphur trioxide.

The amount of oxygen introduced should be kept to a minimum since any unreacted oxygen passing through the converter will have to be separated in a subsequent step. Preferably, oxygen is added in an amount sufficient that the molal ratio of sulphur dioxide to oxygen is not substantially less than one and not substantially greater than two. It may be desirable, however, in some cases to operate with a deficiency of oxygen, especially since small amounts of sulphur dioxide may be more readily separated from chlorine than small amounts of oxygen.

The gas mixture emanating from the converter will consist predominantly of sulphur trioxide and chlorine together with minor amounts of oxygen and/or sulphur dioxide. The composition of this mixture will depend not only upon the sulphur dioxide to oxygen ratio and the efficiency of the converter but also upon the amount of diluent gas (recycled chlorine) introduced. In general, the components of the converter gas other than sulphur trioxide and chlorine will not exceed more than about 25 per cent, by volume, and preferably these components are desirably held to less than about 5 per cent by volume.

The gases emanating from the converter after being suitably cooled are contacted with a substance adapted to form an addition complex with sulphur trioxide. By sulphur trioxide-addition complexes we mean substances which are formed by simple addition reactions between sulphur trioxide and some other compound. Compounds which so react with sulphur trioxide are well known to those skilled in the art, and as examples we may cite sulphur trioxide monohydrate, sodium sulphate, and sodium chloride.

The gases leaving the converter, for example, may be cooled to below 150° C. and preferably to about 50 to 100° C. and passed in contact with sodium chloride, preferably in the presence of a small quantity of hydrogen chloride as a catalyst, and the sulphur trioxide will be absorbed as the sulphur trioxide-addition complex sodium chlorosulphonate. The chlorine passes on unchanged and may be freed of small amounts of sulphur dioxide or sulphur oxychloride, oxygen, and any other impurities present in any suitable manner. The sulphur compounds present may be removed, for example, by scrubbing with water or dilute acids, or by fractional distillation. Oxygen too may be separated by fractional distillation, by preferential adsorption, or in any other suitable manner.

The sodium chlorosulphonate so formed may be recycled to the salt and sulphur trioxide reaction and there decomposed to form additional quantities of sodium sulphate, chlorine, and sulphur dioxide. The use of salt as an absorbent may advantageously be employed in such processes as employ two steps in the salt sulphur trioxide reaction, since in such case sodium chlorosulphonate is a product of the first step of the reaction and also a product of the final step of the process. The two separate lots of sodium chlorosulphonate can be combined in a single step of decomposition to sodium sulphate, chlorine, and sulphur dioxide.

Instead of using sodium chloride as the absorbent to separate sulphur trioxide from the converter gases we have found it of advantage to employ adsorbents in which the sulphur trioxide is loosely bound and can be regenerated. We may, for example, pass the converter gases after being suitably cooled, say to about 20 to 100° C., in contact with sulphuric acid to form oleum or fuming sulphuric acid. The absorbent in such case is the sulphur trioxide monohydrate and may be regenerated on the application of heat sufficient to drive off the absorbed sulphur trioxide and recycled for separating further quantities of sulphur trioxide from the converter gases. The regenerated sulphur trioxide may be recycled to the sodium chloride sulphur trioxide reaction, but for the most part it will be found more desirable to combine the oleum thus produced with oleum from an extraneous source, as for example a contact sulphuric acid plant, and to strip the sulphur trioxide therefrom in a single oleum still. In place of sulphuric acid other absorbents such as sodium sulphate, which forms sodium pyrosulphate, may be used.

In view of the highly reactive nature of mixtures of sulphur dioxide and chlorine, and particularly in view of the tendency of such mixtures to react with water to form sulphuric acid and hydrochloric acid, it is desirable that a high degree of efficiency in the conversion of the sulphur dioxide to sulphur trioxide be obtained if the absorbent contains any substantial quantity of water. We have found that this difficulty may be avoided by using a vanadium catalyst, since with this catalyst a sufficiently high percentage conversion can be obtained that very little chlorine will be lost to the process even if water is present in the absorbent. We have also found that loss of chlorine may be avoided in this manner by effecting the absorption of sulphur trioxide from the converter gases in sulphur trioxide monohydrate. It appears that in an absorbent in which the sulphur trioxide is in an amount at least molecularly equivalent to the water the tendency of sulphur dioxide and chlorine to react with the water to form hydrochloric acid and sulphuric acid is avoided.

This application is a division of application Serial No. 310,838, filed December 23, 1939, of which Ralph K. Iler is now the sole applicant.

We claim:

1. In the manufacture of chlorine and sodium sulphate the method which comprises heating oleum to drive off sulphur trioxide, causing the sulphur trioxide which is thus obtained in the essentially pure state to react with sodium chloride in a manner such that the products are sodium sulphate, sulphur dioxide and chlorine, isolating the solid products of the reaction from the gaseous mixture of sulphur dioxide and chlorine, treating said gaseous mixture catalytically to convert its sulphur dioxide to sulphur trioxide, treating the resulting mixture to separate the chlorine and the sulphur trioxide, recovering the sulphur trioxide as oleum and recycling the oleum to the first-named step.

2. In the manufacture of chlorine and sodium sulphate the method which comprises subjecting sulphur dioxide-containing gas to catalysis under conditions adapted to form sulphur trioxide, passing the sulphur trioxide-containing gas in contact with sulphur trioxide monohydrate under conditions adapted to promote the formation of fuming sulphuric acid thereby to form oleum, heating the oleum to drive off sulphur trioxide which is thus obtained in the essentially pure state to react with sodium chloride in a manner such that the products are sodium sulphate, sulphur dioxide and chlorine, isolating the solid products of the reaction from the gaseous mixture of sulphur dioxide and chlorine, treating said gaseous mixture catalytically to convert its sulphur dioxide to sulphur trioxide, treating the resulting mixture to separate the chlorine and the sulphur trioxide by contacting it with sulphur trioxide monohydrate under conditions adapted to the formation of fuming sulphuric acid thereby to form oleum and recycling the oleum thus formed to the oleum heating step.

3. In the manufacture of chlorine and sodium sulphate the method which comprises causing sulphur trioxide to react with sodium chloride in a manner such that the products are sodium sulphate, sulphur dioxide and chlorine, isolating the solid products of the reaction from the gaseous mixture of sulphur dioxide and chlorine, treating said gaseous mixture catalytically to convert its sulphur dioxide to sulphur trioxide, treating the resulting mixture to separate the chlorine and the sulphur trioxide, said separation being effected by absorption and regeneration of the sulphur trioxide, and recycling the sulphur trioxide thus recovered for reaction with sodium chloride.

4. In the manufacture of chlorine and sodium sulphate the method which comprises causing sulphur trioxide to react with sodium chloride in a manner such that the products are sodium sulphate, sulphur dioxide and chlorine, isolating the solid products of the reaction from the gaseous mixture of sulphur dioxide and chlorine, treating said gaseous mixture catalytically to convert its sulphur dioxide to sulphur trioxide, treating the resulting mixture to separate the chlorine and the sulphur trioxide, said separation being effected by absorption and regeneration of the sulphur trioxide in sulphur trioxide monohydrate, and recycling the sulphur trioxide thus recovered for reaction with sodium chloride.

RALPH K. ILER.
FRANCIS J. McADAM.